(12) United States Patent
Kunz et al.

(10) Patent No.: US 7,808,421 B2
(45) Date of Patent: Oct. 5, 2010

(54) METHODS AND APPARATUS FOR CREATING A SCAN STRATEGY

(75) Inventors: Scott Kunz, Apalachin, NY (US); Jerry L. Twoey, Owego, NY (US); Barrett L. Snedaker, Endicott, NY (US); Raymond Scheuerman, Owego, NY (US); Paul T. Coyne, Endicott, NY (US); David Scheel, Broome, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 295 days.

(21) Appl. No.: 11/971,572

(22) Filed: Jan. 9, 2008

(65) Prior Publication Data

US 2008/0218399 A1 Sep. 11, 2008

Related U.S. Application Data

(60) Provisional application No. 60/879,912, filed on Jan. 10, 2007.

(51) Int. Cl.
*G01S 7/42* (2006.01)
*G01S 13/00* (2006.01)
*G01S 5/02* (2006.01)

(52) U.S. Cl. .......................... 342/13; 342/89; 342/158; 342/422

(58) Field of Classification Search ............. 342/13–20, 342/89–103, 158, 175, 422–424
See application file for complete search history.

(56) References Cited

U.S. PATENT DOCUMENTS

| 3,992,666 | A | | 11/1976 | Edwards et al. |
| 4,021,808 | A | | 5/1977 | Spratt |
| 4,327,417 | A | * | 4/1982 | Zaczek ..................... 703/2 |
| 4,922,256 | A | * | 5/1990 | Brandstetter ................ 342/132 |
| 5,239,301 | A | | 8/1993 | Martin |
| 5,546,089 | A | | 8/1996 | Talbot |
| 5,668,828 | A | | 9/1997 | Sanderford et al. |
| 5,808,580 | A | | 9/1998 | Andrews |
| 5,825,322 | A | | 10/1998 | Capozol |
| 6,169,731 | B1 | | 1/2001 | Stewart et al. |
| 6,335,953 | B1 | | 1/2002 | Sanderford et al. |

(Continued)

FOREIGN PATENT DOCUMENTS

DE 3236101 A1 3/1984

(Continued)

OTHER PUBLICATIONS

Lee et at., "Radar Dwell Scheduling Considering Physical Characteristics of Phased Array Antenna".

(Continued)

*Primary Examiner*—Thomas H Tarcza
*Assistant Examiner*—Peter M Bythrow
(74) *Attorney, Agent, or Firm*—Wolf, Greenfield & Sacks, P.C.; Randy J. Pritzker

(57) ABSTRACT

Some embodiments of the invention are directed to generating a scan strategy based on parameters input from a user, without requiring that the user be aware of information such as the specifics of the receiver hardware or the specific signal characteristics of the emitters that are desired to be detected.

20 Claims, 5 Drawing Sheets

U.S. PATENT DOCUMENTS

| | | | |
|---|---|---|---|
| 6,388,618 | B1 | 5/2002 | Stilp et al. |
| 6,655,719 | B1 | 12/2003 | Curiel |
| 6,859,160 | B1 * | 2/2005 | Gounalis ............... 342/13 |
| 6,859,161 | B1 * | 2/2005 | Bricker et al. ........... 342/13 |
| 6,873,284 | B2 * | 3/2005 | Gounalis ............... 342/13 |
| 6,894,634 | B2 * | 5/2005 | Gounalis ............... 342/13 |
| 6,917,325 | B2 * | 7/2005 | Gounalis ............... 342/20 |
| 6,989,780 | B2 * | 1/2006 | Gounalis ............... 342/13 |
| 7,038,611 | B2 * | 5/2006 | Gounalis ............... 342/13 |
| 7,068,209 | B2 | 6/2006 | Gounalis |
| 7,109,909 | B2 * | 9/2006 | Gounalis ............... 342/13 |
| 7,176,826 | B2 * | 2/2007 | Gounalis ............... 342/13 |
| 2002/0015435 | A1 | 2/2002 | Rieken |
| 2003/0103589 | A1 | 6/2003 | Nohara et al. |
| 2003/0138030 | A1 | 7/2003 | Gavnoudias et al. |
| 2004/0113831 | A1 * | 6/2004 | Gounalis ............... 342/13 |
| 2004/0116090 | A1 * | 6/2004 | Gounalis ............. 455/161.1 |
| 2004/0130476 | A1 * | 7/2004 | Gounalis ............... 342/13 |
| 2004/0135717 | A1 | 7/2004 | Gounalis |
| 2005/0152487 | A1 | 7/2005 | Reichard |
| 2006/0097904 | A1 * | 5/2006 | Gounalis ............... 342/13 |

FOREIGN PATENT DOCUMENTS

| | | |
|---|---|---|
| JP | 05107350 | 4/1993 |
| WO | WO 9641425 A2 | 12/1996 |

OTHER PUBLICATIONS

Heskamp et al., "Scanning System Architecture and Algorithms", pp. 1-36, Freeband Communications.

* cited by examiner

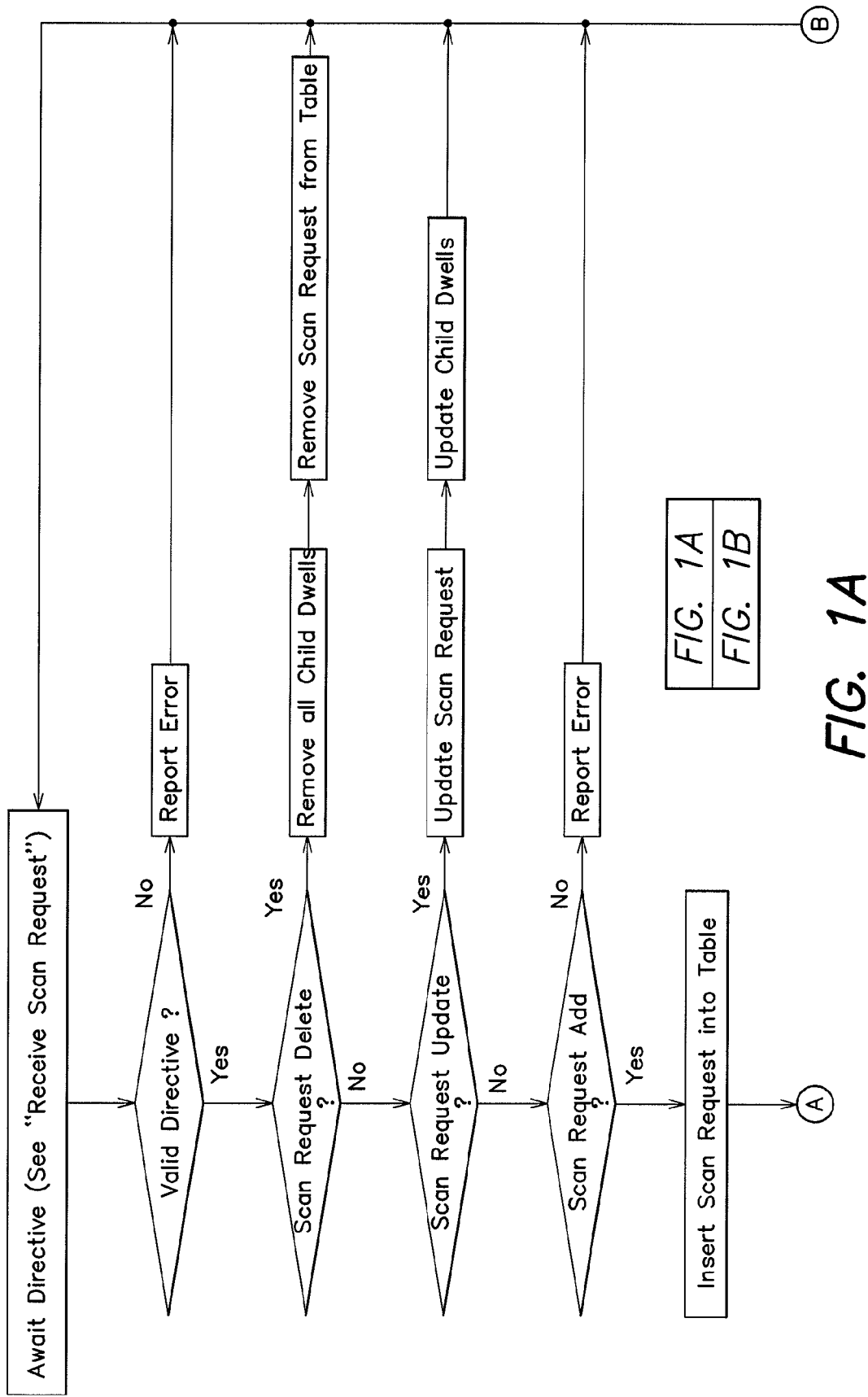

Basic Algorithm:

for each Dwell built for the parent Scan Request...
  for each Dwell Phase (Initial, Extension)...
    for each *Receiver_Function* that is requested for this Dwell Phase (examples include Coarse AOA, Fine AOA, LBI)...
      for each *Receiver_Configuration* that matches Dwell Frequency and *Receiver_Function*...
        Create a Dwell Segment to cover *Receiver_Configuration*.Field_of_View)

Illustration:

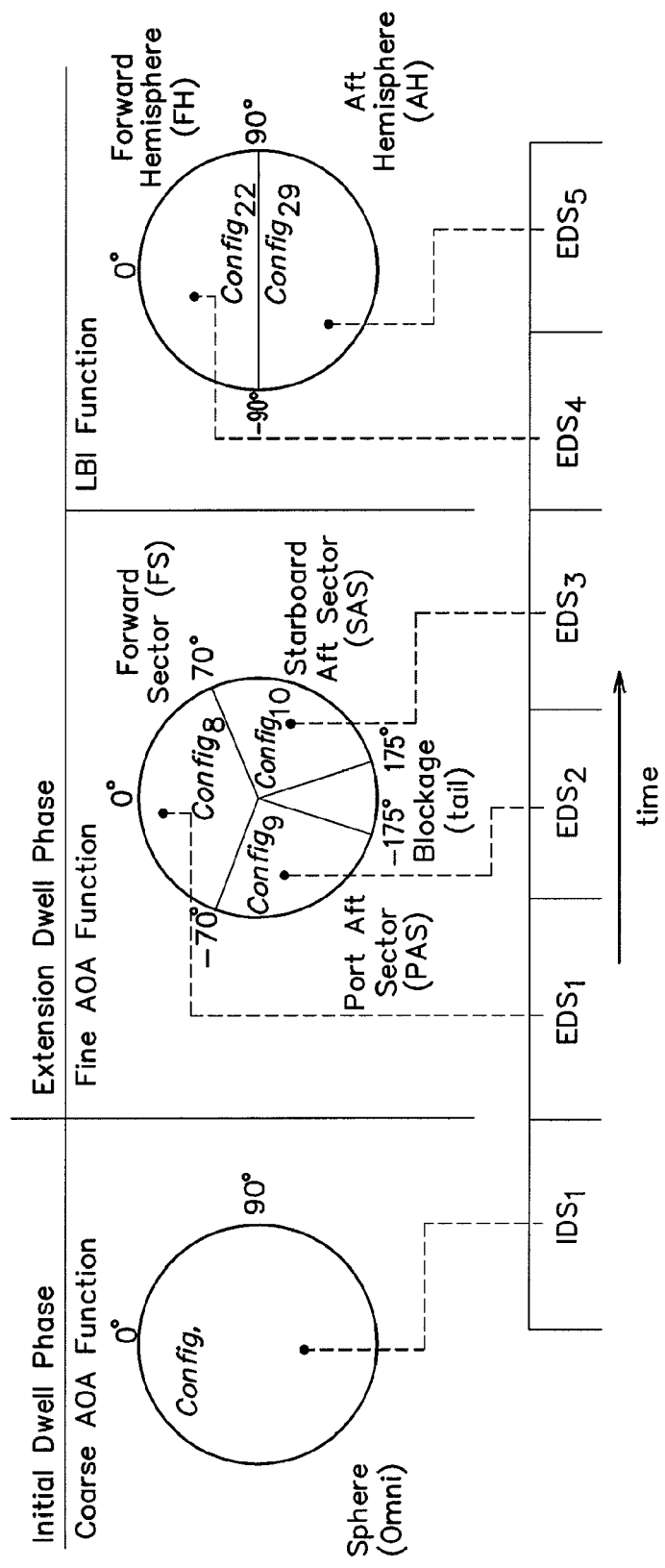

FIG. 4

METHODS AND APPARATUS FOR CREATING A SCAN STRATEGY

CROSS-REFERENCE TO RELATED APPLICATIONS

This application claims the benefit under 35 U.S.C. §119(e) to commonly-owned U.S. provisional patent application Ser. No. 60/879,912, entitled METHODS AND APPARATUS FOR USING A RECEIVER, filed on Jan. 10, 2007. This provisional patent application is hereby incorporated by reference in its entirety.

FIELD OF THE INVENTION

Embodiments of the present invention relate to creating a scan strategy to be executed by a receiver.

DESCRIPTION OF THE RELATED ART

Detection systems exist for detecting signals generated by emitters which are of interest. For example, there are scanners (e.g., a police scanner) that are capable of scanning a frequency band for transmissions within that frequency band. In the case of a police scanner, channels are scanned sequentially to find a signal of interest. Scanning is achieved by tuning receiver hardware to a particular frequency to observe one or more transmissions within that particular frequency.

There are more sophisticated systems to detect transmitted signals that use other methods for determining signals of interest. For instance, there are what are referred to as Electronic Support Measures/Electronic Intelligence (ESM/ELINT) systems for conducting surveillance (e.g., radar, and other signals across a wide range of frequency spectrums). These systems detect one or more signals produced by emitters (often called "threats") that are detected and observed.

For example, in a military aircraft or other vehicle, enemy signals (e.g., radar) may be observed that are capable of detecting the vehicle (e.g., an airplane). These threats may need to be determined prior to detection to ensure the safety of the vehicle, and are often observed and classified to identify the particular threat. For example, certain signals may have particular signatures that are indicative of certain types of emitters. Further, there may be a need to detect and identify the location of a threat (e.g., a radar installation) for targeting purposes.

SUMMARY OF THE INVENTION

One embodiment is directed to a method of determining a scan strategy for execution by a receiver. The method comprises: receiving input from a user specifying parameters for the scan strategy, the parameters including a frequency range to be covered by the scan strategy; computing, based on the parameters and hardware characteristics of the receiver, a set of dwells for the scan strategy. Another embodiment is directed to at least one computer readable medium encoded with instructions that, when executed, perform the above-described method.

A further embodiment is directed to a computer for determining a scan strategy for execution by a receiver. The computer comprises: an interface; and at least one controller, coupled to the interface, that: receives, via the interface, input specifying parameters for the scan strategy, the parameters including a frequency range to be covered by the scan strategy; computes, based on the parameters and hardware characteristics of the receiver, a set of dwells for the scan strategy.

BRIEF DESCRIPTION OF THE DRAWINGS

FIG. 4 is a diagram showing an illustrative process for segmenting dwells to provide requested field of view and/or receiver functionality, in accordance with some embodiments.

DETAILED DESCRIPTION

Figure 1B:
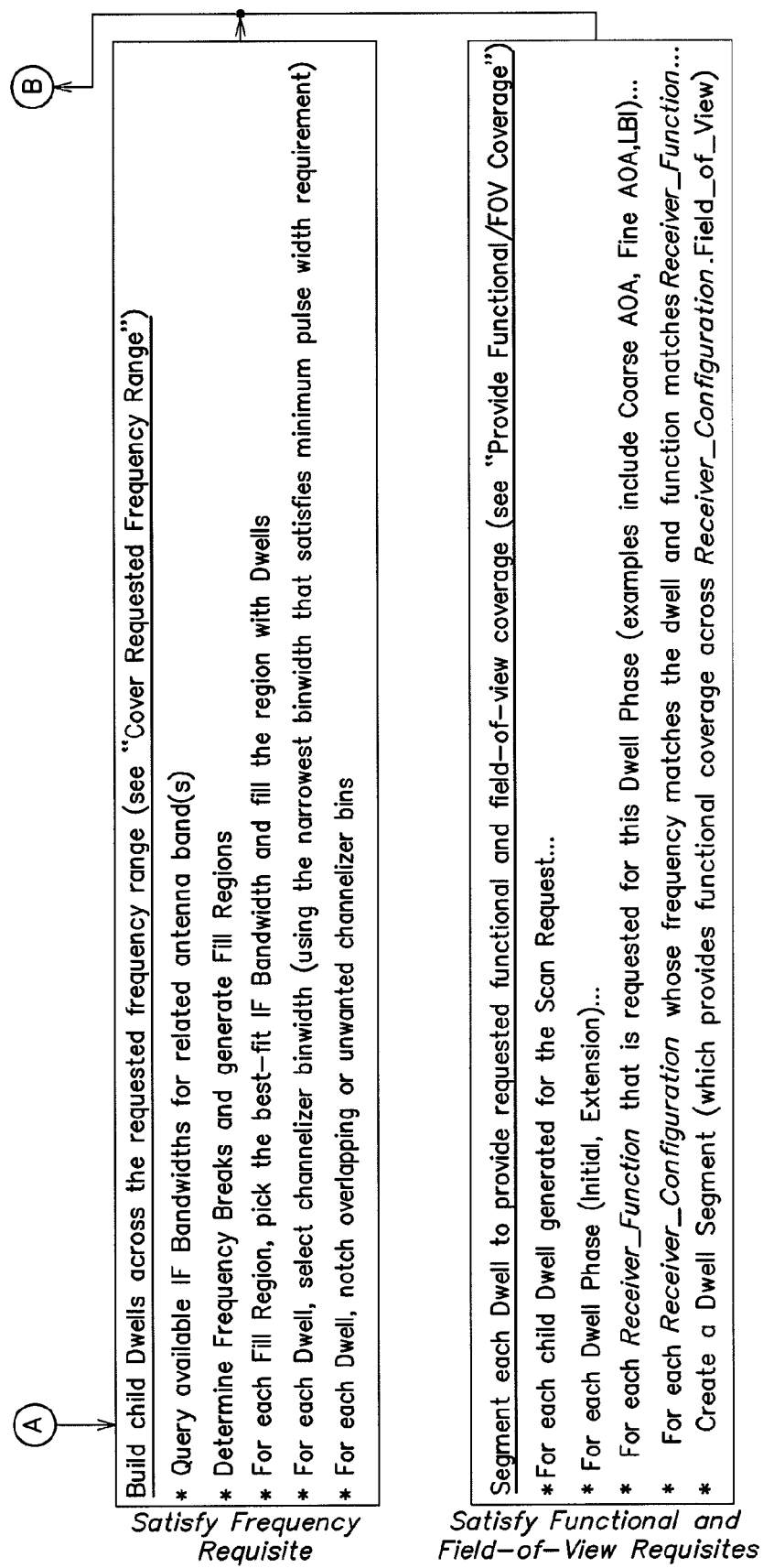
FIG. 1 is a flow chart of an illustrative process for generating a scan strategy, in accordance with some embodiments of the invention.

Often it is desirable to use a receiver to attempt to detect multiple different emitters with different signal characteristics. That is, different emitters may transmit signals in different portions of the frequency spectrum, signals having different pulse widths and/or different pulse repetition intervals, and/or signals having other differing characteristics. As a result, if it desired to detect multiple emitters, the receiver may have to be reconfigured in between listening for particular emitters or sets of emitters. Thus, for example, the receiver may be configured to listen for one emitter or set of emitters and then may be reconfigured to listen for another emitter or set of emitters. A particular receiver configuration is referred to herein as a dwell. Each dwell may have an associated duration and revisit time. The duration of a dwell indicates how long the receiver spends in the configuration associated with the dwell and the revisit time indicates how frequently the dwell is executed. Thus, for example, a dwell with a duration of five milliseconds (ms) and a revisit time of 30 ms would be executed for 5 ms and the re-executed every 30 ms.

In some embodiments, a scan strategy may be computed that defines a set of dwells, each of which has an associated duration and revisit time, to be executed by the receiver to attempt to detect a particular set of emitters. The dwells that form the scan strategy may be selected in any suitable way, as the invention is not limited in this respect. For example, in some embodiments, the dwells that form the scan strategy and their associated durations and revisit times may be selected to attempt to detect a specified set of emitters.

Some embodiments are directed to generating a scan strategy that includes a set of dwells to detect one or more emitters. The number of dwells in a scan strategy, the durations and revisit times of these dwells, their center frequencies, and other characteristics may depend on the emitters that are desired to be detected and the characteristics of the receiver hardware on which the scan strategy is to execute. For example, if it is desired to detect a first emitter that transmits a signal at 2000 MHz and a second emitter that transmits at 2800 MHz, and the intermediate frequency (IF) filter of the receiver has a bandwidth of 1024 MHz, a single dwell (e.g., with a center frequency of 2512 MHz) may be used to detect both emitters. However, if the IF filter of the receiver only has a bandwidth of 512 MHz, then two separate dwells may be used to detect these emitters (e.g., one with a center frequency of 2000 MHz and one with a center frequency of 2800 MHz).

Applicants have appreciated that, in some situations, a human operator of an application program for generating a scan strategy may not be aware of the specifics of the receiver hardware or the specific signal characteristics of the emitters that are desired to be detected. Thus, one embodiment of the invention is directed to generating a scan strategy without requiring that the user be aware of such information. This may be done in any suitable way, as the invention is not limited in this respect.

Applicants have appreciated that many characteristics of the receiver hardware impact the scan strategy. These may include, for example, the number of RF channels in the receiver, the system frequency range, the system antenna configurations, the system IF bandwidths, the channelizer channel bandwidths, the channelizer sampling rate, the system attenuators and amplifiers, the optimal tuner settings for a given frequency range, and other characteristics.

Thus, some embodiments of the invention are directed to a Dwell Builder that generates a scan strategy in response to a request to generate dwells to accomplish a specific task. In some embodiments, the Dwell Builder may acknowledge if the request can be fully met, partially met with degraded performance, or if the request is completely invalid for this particular receiver system. The Dwell Builder algorithm may generate multiple dwells that may be executed sequentially if the particular receiver system is not capable of performing the objective with one dwell.

Applicants have appreciated that there are often multiple receiver configuration options that can perform the same task. In some embodiments, the Dwell Builder may choose the configuration and settings to attempt to optimize the performance for each request. Because the Dwell Builder knows where the system frequency breaks and internal spurs reside for each frequency configuration, it may make the trade-offs to choose the best dwell frequency ranges to accommodate the request.

An example of how the Dwell Builder may create different dwell strategies for the same request is provided below. The example describes how, in some embodiments, the Dwell Builder may create a scan strategy for a particular receiver hardware, in response to a request.

Table 1 below describes some hardware characteristics of Receiver A, Table 2 describes some hardware characteristics of Receiver B, and Table 3 describes some hardware characteristics of the Receiver C.

TABLE 1

4 RF Channels
Antenna configuration capable of 360 Degree Azimuth Field of View, with an Amplitude DF function
256 MHz IF Bandwidth

TABLE 2

4 RF Channels
Antenna configuration capable of 360 Degree Azimuth Field of View, with an Amplitude DF function
512 MHz IF Bandwidth

TABLE 3

2 RF Channels
2 Antenna configurations, with Azimuth Fields of View of 0-180 degrees and 180-360 degrees, with an Amplitude DF function
512 MHz IF Bandwidth In the present example, the Dwell Builder may receive a request to process frequencies from 2,000 MHz to 2,400 MHz with a field of view of a full 360 degrees. For System A, the Dwell Builder may generate a scan strategy having at least 2 dwells that will execute sequentially across multiple frequencies. A possible dwell 1 could process frequencies 2,000-2,256 MHz and dwell 2 could process 2,256-2,400 MHz. Since dwell 2 is less than System A's 256 MHz IF Bandwidth, the center of the dwell may be chosen to optimize spur free performance. In addition dwell 2 may have unneeded channelizer bins disabled to reduce the acquisition of unwanted signals. Finally, the signal processing software may discard any pulse descriptors from signals outside the intended frequency range.

For System B, the Dwell Builder may generate a scan strategy having only one dwell. With one dwell System B could cover the entire frequency range of 2,000-2,400 MHz. This dwell may also be further optimized, as discussed above in connection with dwell 2 of the scan strategy of system A.

Although System C has the same IF Bandwidth as System B, the scan strategy generated for System C may have 2 dwells that will execute sequentially across multiple fields of view because each antenna configuration for System C is capable of only half the field of view of System B. Both dwells may have a frequency range similar to the frequency range of the dwell generated for System B, with one dwell having a field of view of 0-180 and the other with a field of view of 180-360 degrees.

Thus, in some embodiments, the Dwell Builder may receive a request to generate a scan strategy that indicates certain parameters, such as desired frequency range, field of view, and/or dwell functionality. If some parameters are not specified the Dwell Builder may use default values for the unspecified parameters. The Dwell Builder may be aware of the characteristics of the receiver hardware on which the scan strategy is to be executed, and may be aware of the functional capabilities for the receiver's antenna configuration. For instance some antenna configurations are capable of only detecting signals, while other configurations are designed for functions such as Amplitude DF angle of arrival (AOA), Short Baseline Interferometry, or Long Baseline Interferometry. With additional RF Channels, multiple functions can be performed simultaneously. The Dwell Builder algorithm may generate a scan strategy based on the request and the characteristics of the receiver hardware.

The Dwell Builder may be implemented in any suitable way, as the invention is not limited in this respect. For example, the Dwell Builder may be implemented in hardware, software, firmware, and/or any combination thereof.

FIG. 1 is a flow chart of an algorithm that may be used in some embodiments by the Dwell Builder for generating a scan strategy. The Dwell Builder may create a scan table that includes a series of dwells that satisfy received scan requests. The process begins when the dwell builder receives a scan request. The scan request may be one of several types. That is, the request may be a request to delete a scan strategy, a request to update a scan strategy, or a request to add (i.e., create) a scan strategy. If the request is invalid, an error may be reported to the user. If the request is a request to delete a previous request to build a scan strategy, the child dwells of that strategy may be removed from the scan table. If the request is a request to update a previously issued scan request, then the child dwells of scan strategy associated with the request may be updated. If the request is a request to add a scan strategy, then a scan strategy that satisfied the request may be generated.

Figure 2:
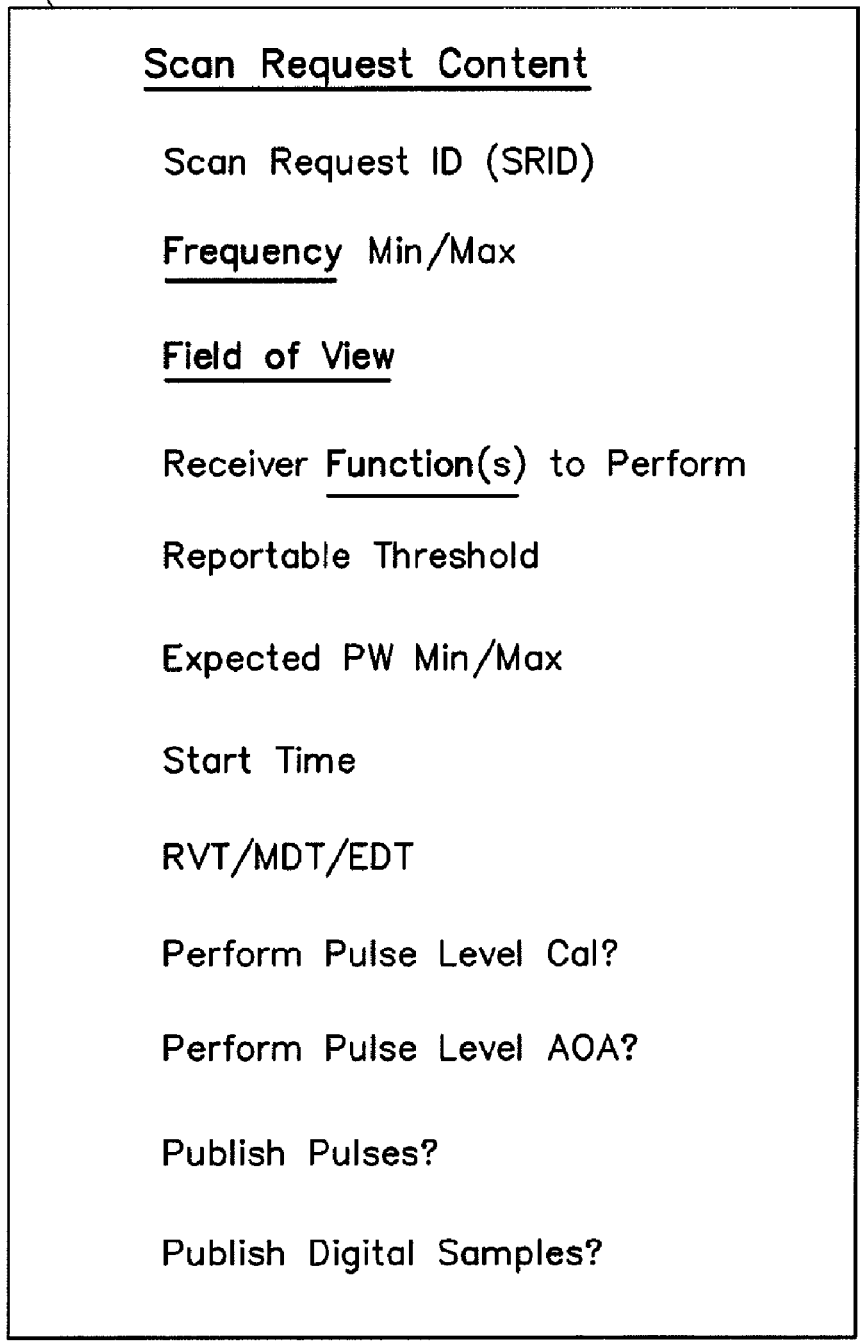
FIG. 2 is a block diagram of an illustrative scan request to generate a scan strategy, in accordance with some embodiments.

The request to generate a scan strategy may have any suitable format and may include any suitable information, as the invention is not limited in this respect. An example of a request to generate a scan strategy is shown in FIG. 2. In FIG. 2, scan request 501 includes a scan request ID and specifies a frequency range to be covered by the scan strategy, a field of view to be covered by the scan strategy, functions for the receiver to perform, a reportable threshold, an expected pulse width range of the signals that are desired to be detected, a start time for the scan strategy, a revisit time, a minimum dwell time, and an extended dwell time for the dwells in the scan strategy, whether pulse level calibration should be performed, whether pulse level angle of arrival should be computed, whether the receiver should publish the pulses that it detects, and whether the receiver should publish the digitized samples of the signals that it has detected. It should be appreciated that a scan request need not specify all of these parameters and if some parameters are not specified, default values may be used.

It should be appreciated that the scan request shown in FIG. 2 is only one example of a scan request, and the invention is not limited in this respect as any suitable scan request may be used. The scan request need not include all the fields shown in scan request 501 and/or may include additional fields not included in scan request 501.

As shown in FIG. 1, generating the scan strategy may be a two step process. First, child dwells covering the requested frequency range may be built. Then, each child dwell may be segmented to provide requested functionality and field of view coverage.

Figure 3:
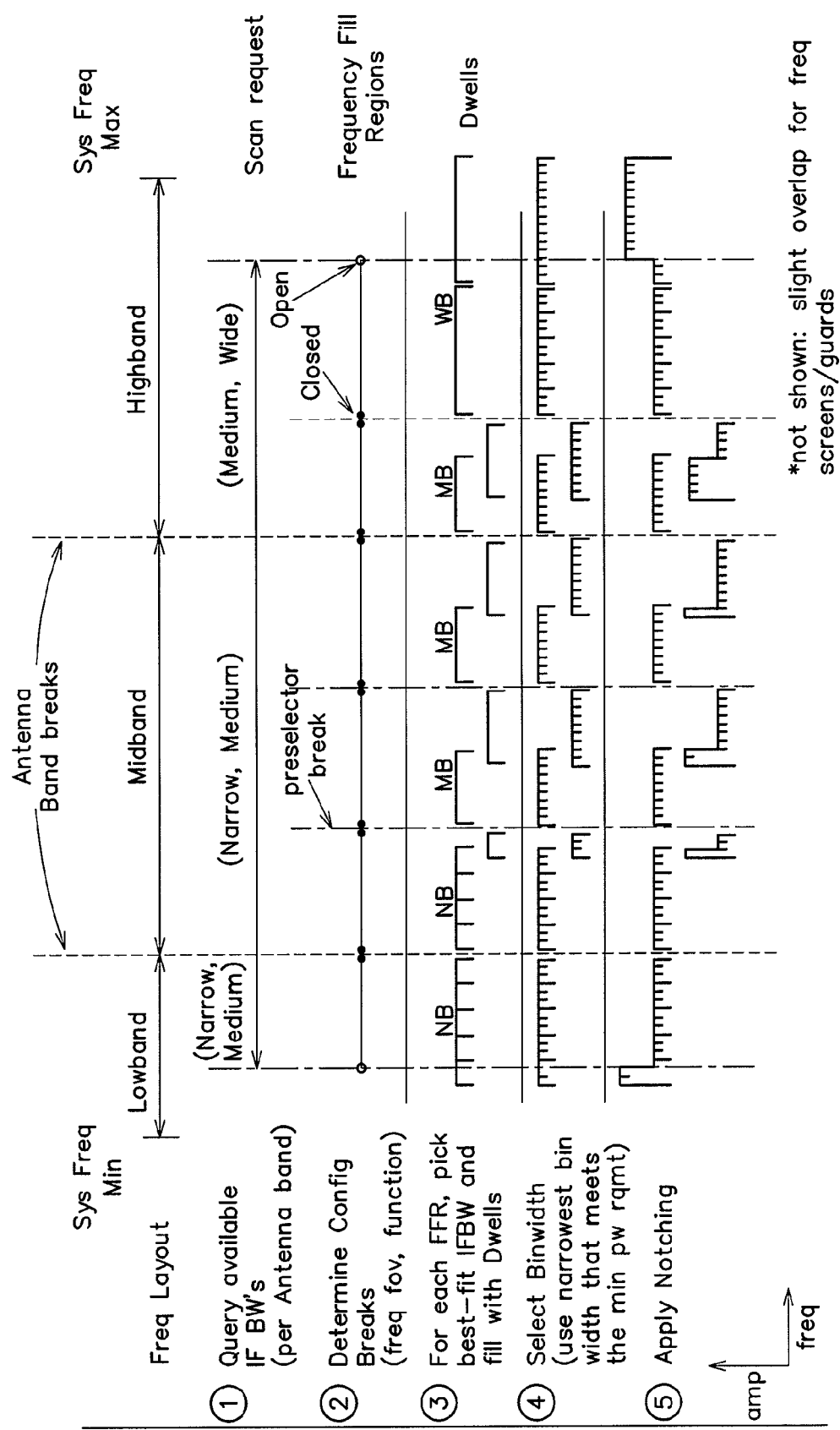
FIG. 3 is a diagram showing an illustrative process for generating dwells to cover a requested frequency range, in accordance with some embodiments.

FIG. 3 shows a process for creating dwells to cover the requested frequency range. As shown in FIG. 3, the IF bandwidths for each antenna band (e.g., lowband, midband, and highband) are first determined. The IF bandwidth for each antenna band is an attribute of the receiver, which may be a function of, inter alia, the bandwidth of the IF filters for each antenna band.

Next, the frequency breaks are determined. Frequency breaks are portions of the frequency spectrum across which a dwell cannot span. A frequency break may result from, for example, an antenna break (e.g., one antenna of the receiver can receive signals up to 1 GHz, and the next antenna receives signals from 1 GHz and higher) and/or preselector breaks. Frequency fill regions are then generated. A frequency fill region is the portion of the requested frequency spectrum in between frequency breaks.

For each frequency fill region, dwells may be generated to fill the region. Any suitable bandwidth for the dwells in a fill region may be used. In some embodiments, the bandwidth of each dwell in the fill region may be the IF bandwidth of the receiver for the antenna band in which the dwell is located.

Next, for each dwell, the channelizer binwidth may be selected. In some embodiments, the narrowest binwidth that can detect the minimum pulse width specified in the scan request (or the default value minimum pulse width if none is specified in the request) may be used. Last, for each dwell, overlapping or unwanted channelizer bins may be notched.

It should be appreciated that the process in FIG. 3 is one example of a process for building dwells that may be used in some embodiments of the invention. However, the invention is not limited to this specific process, as other processes may be used.

Once the child dwells are built (e.g., as described in connection with FIG. 3), each child dwell may be segmented to provide requested functionality and field of view coverage. As discussed above, a scan request (e.g., scan request 501) may specify functionality the scan strategy is requested to perform, as well as a requested field of view coverage. Examples of functions that may be requested include azimuth detection, elevation detection, azimuth omni, elevation omni, azimuth amplitude direction finding, elevation amplitude direction finding, azimuth long baseline interferometry, elevation long baseline interferometry, azimuth short baseline interferometry, elevation short baseline interferometry, high gain analysis, coarse angle of arrival, fine angle of arrival, and/or any other suitable function.

FIG. 4 shows one example of an algorithm that may be used in some embodiments of the invention to segment child dwells to provide requested functionality and field of view coverage. First each child dwell is identified. Each child dwell may have two phases (i.e., an initial phase and an extension phase). The initial phase is the phase of the dwell whose segments are executed every time the dwell is executed. The extension phase is the phase of the dwell that includes segments that may be executed, in some situations, after the initial phase of the dwell. Thus, for example, if a signal of interest is detected during one or more segments of the initial phase of the dwell, then one or more segments of the extension phase of the dwell may be executed, for example, to obtain further information about the signal of interest. If, for example, no signals are detected during the initial phase segment(s) of a dwell, then no extension phase segments of the dwell may be executed.

Each dwell phase may be segmented into multiple dwells as follows. For each receiver function that has been requested for each dwell phase (e.g., coarse angle of arrival function, fine angle of arrival function, long baseline interferometry function, etc.), the receiver configuration (e.g., collection of antenna elements and associated receiver front end hardware) that is capable of performing that function for the frequency range and field of view of the dwell are identified. Then, a dwell segment is created to perform the function for the frequency range and field of view of the dwell.

For example, as shown in FIG. 4, six dwell segments (i.e., $IDS_1$, $EDS_1$, $EDS_2$, $EDS_3$, $EDS_4$, $EDS_5$) may be created to satisfy the requested functions and fields of view. In the example of FIG. 4, the only function requested for the initial phase is a coarse angle of arrival (also referred to herein as an amplitude direction finding function). Because the receiver is capable of performing this function with a field of view of 360 degrees, only one dwell segment is created (i.e., $IDS_1$).

In the extension phase, two dwell functions are requested. First, a fine AOA function (also referred to as a short baseline interferometry function) is requested. Three extension dwell segments are created to perform this function for the requested fields of view. First extension dwell segment ($EDS_1$) performs a fine angle of arrival function with a field of view covering a forward sector (e.g., of a vehicle in which the receiver is located). The second extension dwell segment ($EDS_2$) performs a fine angle of arrival function with a field of view covering a port aft sector. The third extension dwell segment ($EDS_3$) performs a fine angle of arrival function with a field of view covering a starboard aft sector.

The other extension phase function that is requested is a long baseline interferometry function. Thus, two extension dwell segments ($EDS_5$ and $EDS_6$) are created to perform this function for the requested field of view. That is, each of these segments has a field of view of 180 degrees.

It should be appreciated that the process in FIG. 4 is one example of a process for segmenting dwells that may be used in some embodiments of the invention. However, the invention is not limited to this specific process, as other processes may be used.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. The one or more controllers may be included in one or more host computers, one or more storage systems, or any other type of computer that may include one or more storage devices coupled to the one or more controllers.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," or "having," "containing", "involving", and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method, performed by a microprocessor, of determining a scan strategy for execution by a receiver, the method comprising:
   receiving input from a user specifying parameters for the scan strategy, the parameters including a directly specified frequency range to be covered by the scan strategy;
   in response to receiving the user-specified parameters, computing, based on the parameters and hardware characteristics of the receiver, a set of dwells for the scan strategy.

2. The method of claim 1, wherein the parameters further include a field of view for the scan strategy.

3. The method of claim 1, wherein the parameters further include receiver functions to be performed.

4. The method of claim 1, wherein the receiver functions include at least one of amplitude DF angle of arrival, short baseline interferometry, and long baseline interferometry.

5. The method of claim 1, wherein the act of computing the set of dwells further comprises acts of:
   determining child dwells covering the frequency range included in the parameters; and
   segmenting at least one of the child dwells to provide a field of view included in the parameters or to provide a receiver function included in the parameters.

6. The method of claim 1, wherein the act of determining child dwells covering the frequency range further comprises acts of:
   determining, based on the hardware characteristics of the receiver, an intermediate frequency (IF) bandwidth for each antenna band of the receiver;
   determining frequency breaks in the frequency range; and
   determining based, on the frequency breaks, at least one frequency fill region in the frequency range; and
   for each of the at least one frequency fill regions, generating at least one dwell to fill the frequency fill region.

7. The method of claim 6, wherein the act of generating at least one dwell to fill the frequency fill region further comprises an act of:
   selecting a bandwidth for the at least dwell based on the IF bandwidth of the receiver in the antenna band in which the at least dwell is located.

8. At least one computer readable medium encoded with instructions that, when executed, perform a method of determining a scan strategy for execution by a receiver, the method comprising:
   receiving input from a user specifying parameters for the scan strategy, the parameters including a directly specified frequency range to be covered by the scan strategy;
   in response to receiving the user-specified parameters, computing, based on the parameters and hardware characteristics of the receiver, a set of dwells for the scan strategy.

9. The at least one computer readable medium of claim 8, wherein the parameters further include a field of view for the scan strategy.

10. The at least one computer readable medium of claim 8, wherein the parameters further include receiver functions to be performed.

11. The at least one computer readable medium of claim 8, wherein the receiver functions include at least one of amplitude DF angle of arrival, short baseline interferometry, and long baseline interferometry.

12. The at least one computer readable medium of claim 8, wherein the act of computing the set of dwells further comprises acts of:
   determining child dwells covering the frequency range included in the parameters; and
   segmenting at least one of the child dwells to provide a field of view included in the parameters or to provide a receiver function included in the parameters.

13. The at least one computer readable medium of claim 8, wherein the act of determining child dwells covering the frequency range further comprises acts of:
   determining, based on the hardware characteristics of the receiver, an intermediate frequency (IF) bandwidth for each antenna band of the receiver;
   determining frequency breaks in the frequency range; and
   determining based, on the frequency breaks, at least one frequency fill region in the frequency range; and
   for each of the at least one frequency fill regions, generating at least one dwell to fill the frequency fill region.

14. The at least one computer readable medium of claim 13, wherein the act of generating at least one dwell to fill the frequency fill region further comprises an act of:

selecting a bandwidth for the at least dwell based on the IF bandwidth of the receiver in the antenna band in which the at least dwell is located.

15. A computer for determining a scan strategy for execution by a receiver, the computer comprising:

an interface; and at least one controller, coupled to the interface, that:

receives, via the interface, input specifying parameters for the scan strategy, the parameters including a directly-specified frequency range to be covered by the scan strategy;

in response to receiving the parameters, computes, based on the parameters and hardware characteristics of the receiver, a set of dwells for the scan strategy.

16. The computer of claim 15, wherein the parameters further include a field of view for the scan strategy.

17. The computer of claim 15, wherein the parameters further include receiver functions to be performed, the receiver functions including at least one of amplitude DF angle of arrival, short baseline interferometry, and long baseline interferometry.

18. The computer of claim 15, wherein the at least one controller:

determines child dwells covering the frequency range included in the parameters; and segments at least one of the child dwells to provide a field of view included in the parameters or to provide a receiver function included in the parameters.

19. The computer of claim 15, wherein the at least one controller:

determines, based on the hardware characteristics of the receiver, an intermediate frequency (IF) bandwidth for each antenna band of the receiver;

determines frequency breaks in the frequency range; and determines based, on the frequency breaks, at least one frequency fill region in the frequency range; and for each of the at least one frequency fill regions, generates at least one dwell to fill the frequency fill region.

20. The computer of claim 19, wherein the at least one controller:

selects a bandwidth for the at least dwell based on the IF bandwidth of the receiver in the antenna band in which the at least dwell is located.

* * * * *